Oct. 31, 1939.     R. H. MANLY     2,178,145
MOTION PICTURE CAMERA
Filed Feb. 9, 1938
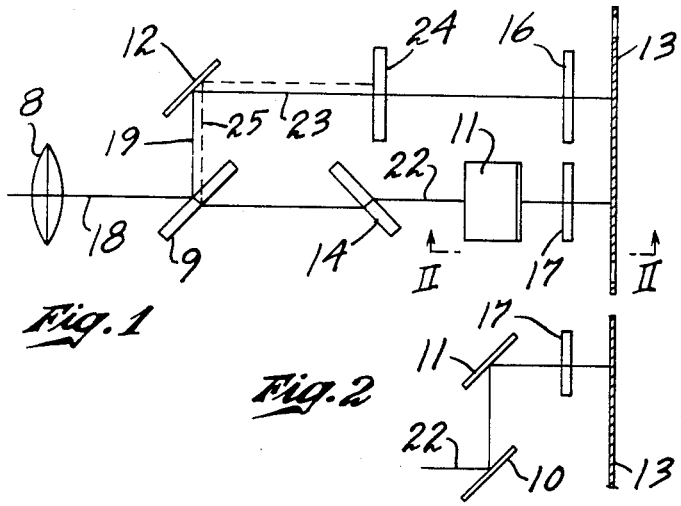
Fig.1
Fig.2
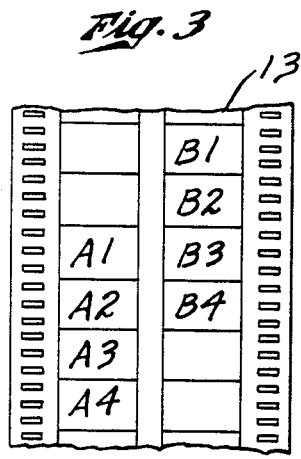
Fig.3
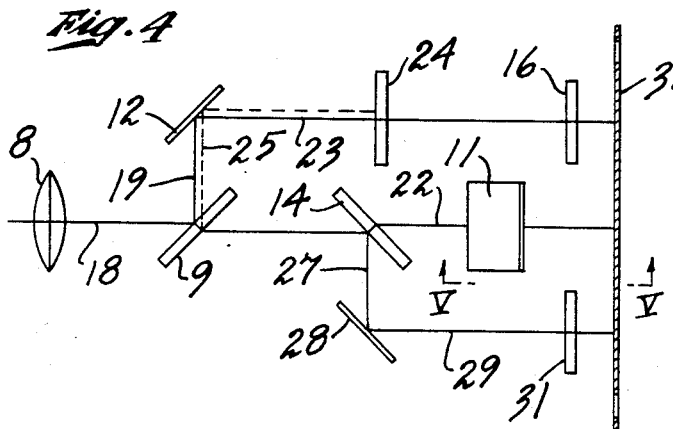
Fig.4
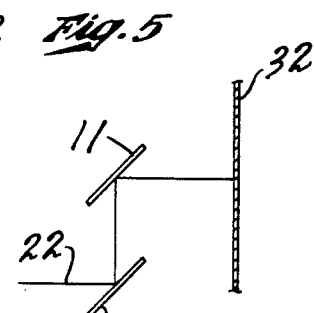
Fig.5
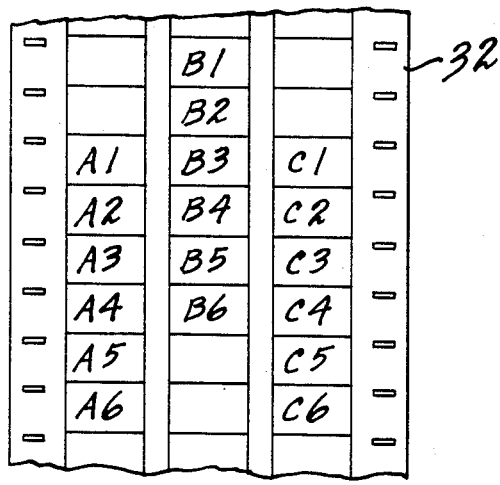
Fig.6
INVENTOR
Roy H. Manly
BY Charles H. Bassett
ATTORNEY Patented Oct. 31, 1939

2,178,145

UNITED STATES PATENT OFFICE 2,178,145

MOTION PICTURE CAMERA

Roy H. Manly, Birmingham, Ala.

Application February 9, 1938, Serial No. 189,523

1 Claim. (Cl. 88—1)

My invention relates to motion picture cameras and more particularly contemplates the provision of improvements whereby colored pictures may be taken and be reproduced on a screen free of color fringe, ghosts or double reflection, and other objectionable features to be found in color photography.

My invention further contemplates the provision of improvements in cameras for recording two or more identical pictures of a scene and in which a differently colored filter is employed in connection with each of the several pictures. While multiple pictures in color have heretofore been taken in color photography, it has been found impracticable in many instances when used in photographing moving objects for reasons which have been set forth by others and which is well known to those skilled in this art.

My invention further contemplates improvements in motion picture cameras whereby it is not necessary to provide a coating material to the transparent reflecting surfaces for dividing and directing the light in several directions to record multiple pictures.

My invention further contemplates improvements in motion picture cameras having transparent and opaque reflectors for dividing and directing the light in several different directions for simultaneously recording multiple pictures of a scene and in which the light travel is the same from the lens to the several pictures. The transparent reflectors are formed of light polarized glass and arranged to prevent what is known in this art as double reflections or ghosts.

My invention embodies other novel features, details of construction, and arrangement of parts which are hereinafter set forth in the specification and claim and illustrated in the accompanying drawing, forming part thereof, wherein:

Fig. 1 is a diagrammatic illustration of a camera arrangement for recording two pictures on a film;

Fig. 2 is a sectional view taken along the line II—II of Fig. 1;

Fig. 3 is a front view of the film employed in the camera illustrated in Fig. 1 and showing the arrangement of the pictures thereon;

Fig. 4 is a diagrammatic plan view of a modified form of my invention in which three pictures of an object may be taken simultaneously;

Fig. 5 is a sectional view taken along the line V—V of Fig. 4; and

Fig. 6 is a front view of the film employed in the camera illustrated in Fig. 4, showing the arrangement of the pictures thereon.

Referring now to the drawing for a better understanding of my invention and more particularly to Figs. 1, 2, and 3, I show a camera comprising a lens 8, a transparent reflector 9, and opaque reflectors 10, 11, and 12. The transparent reflector 9 is arranged to divide and direct the light passing from the lens 8 thereto along two equidistant paths of travel to the film 13, in order that two like pictures of an object may be taken simultaneously. An oblique glass plate 14 is positioned behind the transparent reflector 9 in order to give the reflected ray passing thereto the degree of refraction which is received by the rays passing through the transparent reflector 9. The usual color filters 16 and 17 are interposed in the light rays.

The light enters the camera through the lens 8 and passes along the line 18 to the transparent reflector 9. This reflector 9 is formed of light polarized glass and is disposed at an angle to the light passing thereto from the lens and causes a portion of the light to pass along the line 19 to the opaque reflector 12. A portion of the light passes through the transparent reflector 9 and travels along the line 21 to the glass plate 14 where it is refracted and directed along the line 22 to the opaque reflector 10. The light is directed from reflector 10 to the reflector 11 and thence through the color filter 17 to the film 13. The front surface of the reflector 9 is employed for directing a portion of the light to the reflector 12 and thence along the line 23 through the light polarized glass 24 and color filter 16 to the film. The back surface of the reflector 9 also reflects light to the reflector 12, as indicated by the dotted line 25, and forms what is known as double reflections or "ghosts" in the picture if it is not removed by means of the polarization embodied in the reflector 9 and light polarized glass 24. By mounting the members 9 and 24 so that their respective light polarization elements are disposed at right angles with respect to each other, the light reflected by the back surface of the member 9 will not pass through to the film but will be blocked out by the joint action of the polarized members 9 and 24.

In Figure 3, I show the manner in which the pictures are arranged on the film 13. Pictures A1 and B1 are taken simultaneously and are followed by A2, B2; etc.

Figures 4, 5, and 6 show a modified form of my invention arranged to take three pictures simultaneously. This form of my invention is similar to that shown in Figures 1 and 2 except that a blue filter 26 is employed in place of the glass plate 14 and serves to divide the light passing thereto. A portion of the light is reflected by the front surface of the filter 26 and directed along the line 27 to the opaque reflector 28 and thence, along the line 29, through the red filter 31 to the film 32. As illustrated in Figure 6, pictures A1, B1, and C1 are taken simultaneously and followed by A2, B2, and C2.

While I have shown my invention in but two forms it is obvious to those skilled in the art that it is not so limited but is susceptible of various changes and modifications without departing from the spirit thereof; and I desire, therefore, that only such limitations shall be placed thereupon as are imposed by the prior art.

I claim:

In a camera for taking multiple pictures on a photosensitive film material, a lens for the passage of light into the camera, a transparent reflector disposed at an angle to the light passing thereto from the lens to divide and direct the light along two paths of travel, part of the light being reflected along one path of travel by the front and rear surfaces of the transparent reflector and the other part passing through the said reflector, said reflector being formed of light polarizing material, a light polarizing element disposed to coact with the transparent reflector to block out light being reflected by the rear surface of the transparent reflector, and means for directing the divided light along parallel paths to adjacent portions of the film material.

ROY H. MANLY.